US007519473B2

(12) United States Patent
Oka et al.

(10) Patent No.: US 7,519,473 B2
(45) Date of Patent: Apr. 14, 2009

(54) DEVICE AND METHOD FOR ESTIMATING OCCURRENCE DISTRIBUTION OF UNASCERTAINED WATER AND RECORDING MEDIUM

(75) Inventors: Toshiaki Oka, Tokyo (JP); Hiroaki Tsutsui, Tokyo (JP)

(73) Assignee: Yamatake Corporation, Tokyo (JP)

( * ) Notice: Subject to any disclaimer, the term of this patent is extended or adjusted under 35 U.S.C. 154(b) by 365 days.

(21) Appl. No.: 10/561,781

(22) PCT Filed: Jul. 2, 2004

(86) PCT No.: PCT/JP2004/009437

§ 371 (c)(1),
(2), (4) Date: Dec. 19, 2005

(87) PCT Pub. No.: WO2005/003471

PCT Pub. Date: Jan. 13, 2005

(65) Prior Publication Data

US 2007/0095729 A1    May 3, 2007

(30) Foreign Application Priority Data

Jul. 4, 2003   (JP)   ............................. 2003-271029

(51) Int. Cl.
*G01V 3/00* (2006.01)
(52) U.S. Cl. .................. 702/2; 702/1; 702/3; 702/4; 702/5; 702/6; 210/163; 210/221.2
(58) Field of Classification Search ................. 702/1–6; 210/163, 167, 221.2
See application file for complete search history.

(56) References Cited

U.S. PATENT DOCUMENTS

| 3,815,749 | A | * | 6/1974 | Thompson | ................... 210/163 |
| 4,987,913 | A | * | 1/1991 | Kodate et al. | ................... 137/1 |
| 5,620,594 | A | * | 4/1997 | Smith et al. | ............... 210/167.3 |
| 7,297,258 | B2 | * | 11/2007 | Gomes De Oliveira | .. 210/221.2 |

FOREIGN PATENT DOCUMENTS

| JP | 2000-204642 | A |   | 7/2000 |
| JP | 2001-126074 | A |   | 5/2001 |
| JP | 2003-027567 | A |   | 1/2003 |
| JP | 2001-184160 | A |   | 7/2003 |
| JP | 2006-090258 |   | * | 4/2006 |

* cited by examiner

*Primary Examiner*—Tung S Lau
*Assistant Examiner*—Sujoy K Kundu
(74) *Attorney, Agent, or Firm*—Blakely, Sokoloff, Taylor & Zafman LLP (57) ABSTRACT

On the basis of rainfall amount data (24) representing a timeseries change in the amount of rainfall in a district as an estimation target and unascertained water amount data (23) representing a time-series change in the amount of unascertained water at a base point located downstream of each district, an unascertained water occurrence distribution estimating unit (12) of a control unit (10) calculates a correlation value between the rainfall amount data (24) in each district and the unascertained water amount data (23), and outputs each correlation value as an unascertained water occurrence distribution in each district.

1 Claim, 11 Drawing Sheets

UNASCERTAINED WATER OCCURRENCE DISTRIBUTION DATA

| DISTRICT | CORRELATION VALUE |
|---|---|
| A | 0.71 |
| B | 0.64 |
| ⋮ | ⋮ |

REACHING TIME DATA

| DISTRICT | REACHING TIME |
|---|---|
| A | 2.5 hr |
| B | 1 hr |
| ⋮ | |

DEVICE AND METHOD FOR ESTIMATING OCCURRENCE DISTRIBUTION OF UNASCERTAINED WATER AND RECORDING MEDIUM

The present patent application is a non-provisional application of International Application No. PCT/JP2004/009437, filed Jul. 2, 2004.

BACKGROUND OF THE INVENTION

1. Field of the Invention

The present invention relates to a device and method for estimating the occurrence distribution of unascertained water and, more particularly, to a device and method for estimating the occurrence distribution of unascertained water, which estimate the occurrence distribution of unascertained water flowing into a sewer, and a recording medium.

BACKGROUND ART

Sewers are broadly classified into two systems, namely the combined system and the separate system, according to the differences in the treatment methods for domestic wastewater and rainwater. The combined system is a system for collectively treating domestic wastewater and rainwater. The separate system is a system for separately treating domestic wastewater and rainwater. In the combined system, although underground sewage pipes can be commonly used for domestic wastewater and rainwater, the sewage treatment plant needs to treat both domestic wastewater and rainwater, and hence suffers from heavy wastewater treatment workload. In the separate system, although drain pipes dedicated for rainwater must be laid, the sewage treatment plant is only required to perform wastewater treatment for only domestic wastewater, and hence its treatment workload can be reduced.

2. Description of Related Art

Conventionally, a system for estimating the amount of flow into such a sewer or sewage treatment plant in accordance with season, temperature, day of the week, and holiday has been proposed (e.g., Japanese Patent Laid-Open No. 2003-027567).

Figure 14:
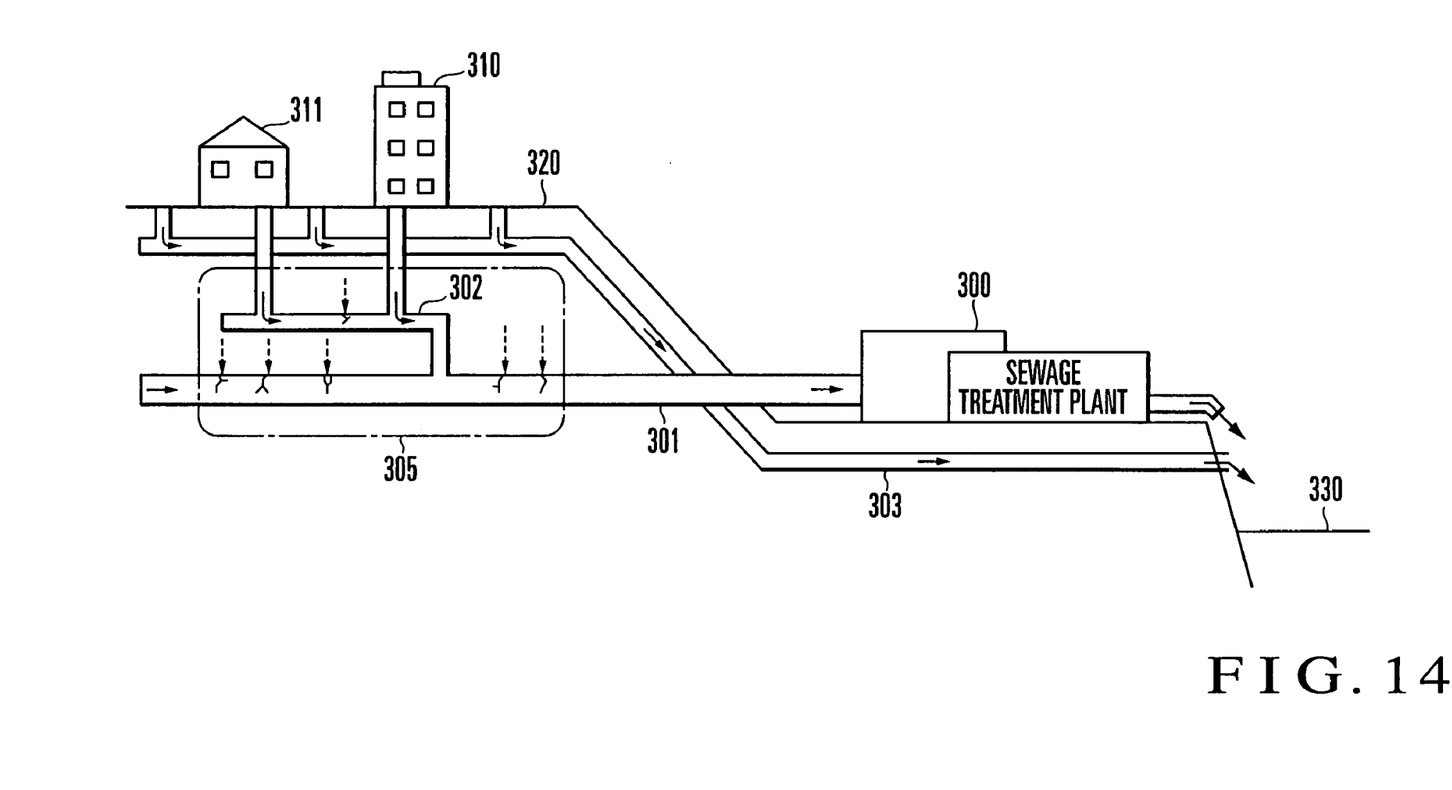
FIG. 14 is a view showing an example of a separate system sewer.

FIG. 14 shows an example of a separate system sewer. In general, a sewage treatment plant 300 is located downstream of a treatment target area, performs sewage treatment upon collecting domestic wastewater from a building/factory 310 and house 311 in the treatment target area through a sewage pipe 302 and trunk sewer 301, and discharges the water to a river or sea. Rainwater is discharged to the river or sea directly or through a distributing pipe 303 different from the sewage pipe 302 and trunk sewer 301.

It therefore suffices if the sewage treatment plant 300 performs wastewater treatment for only domestic wastewater from a target treatment area, i.e., the amount of water to be consumed in a water supply system. This makes it possible to reduce the wastewater treatment performance and size of the sewage treatment plant 300, thereby reducing the treatment cost.

In practice, however, sewage water more than expected tends to flow into the separate system sewage treatment plant. If such sewage water exceeds the treatment performance of the plant, an overflow occurs, i.e., the plan cannot help but discharge the water to the river or sea without treatment. This also results in the addition of sewage treatment facilities and an increase in treatment cost.

In general, water which is not ascertained and causes such an increase in wastewater treatment amount is called unascertained water. One of the major factors that cause such unascertained water is the entrance of rainwater into the trunk sewer 301 and sewage pipe 302. This entrance includes indirect entrance caused by various kinds of piping failures such as piping damages and connection failures at piping connection portions due to the deterioration of the trunk sewer 301 and sewage pipe 302, and direct entrance through manhole covers and due to failures in home drainage facilities and the like. In a treatment target area, therefore, it is necessary to specify the occurrence portion of such unascertained water and make repair of pipings and facilities and an improvement in watertightness as tracking entering water measures.

Figure 15:
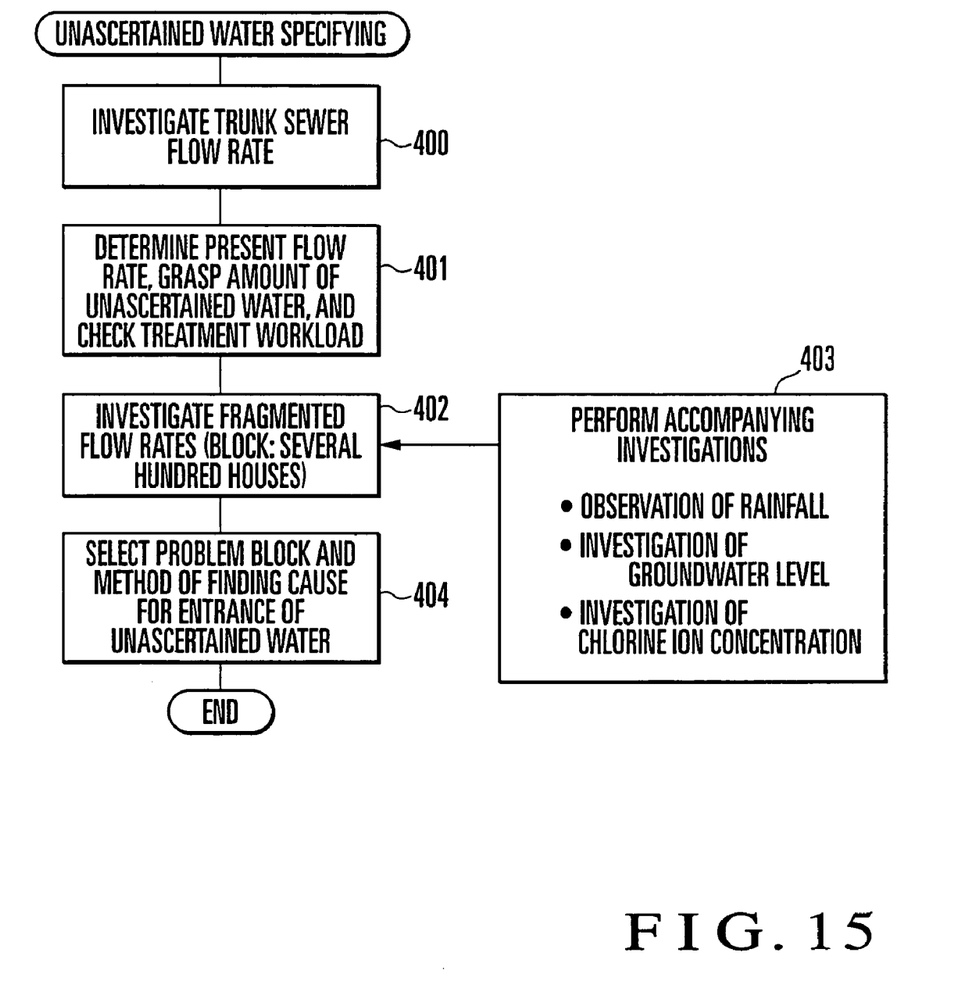
FIG. 15 is an operation flow showing unascertained water specifying operation.

As operation of specifying the occurrence portion of such unascertained water, it is conceivable that the processing operation shown in FIG. 15 must be done. FIG. 15 is an operation flow showing unascertained water specifying operation.

First of all, a flow rate investigation is performed in a trunk sewer (step 400). The present flow rate is measured, and the amount of unascertained water is grasped, thereby checking the processing workload in a sewage treatment plant (step 401). A processing target area is then divided into blocks each including several hundred houses, and a fragmented flow rate investigation is performed for each block (step 402). In this case, a rainfall investigation, groundwater level investigation, chlorine ion concentration investigation, and the like are performed as accompanying investigations (step 403).

As a tracking entering water measure plan, a problem block is selected, and a method of finding a cause for the entrance of unascertained water is selected (step 404).

BRIEF SUMMARY OF THE INVENTION

Tracking entering water measures need to be efficiently executed by selecting occurrence portions of unascertained water exhibiting high failure degrees and good repairing effects from a wide sewage treatment target area. In practice, however, according to the unascertained water specifying operation in FIG. 15, in step 400, the amounts of sewage water can be investigated in only several places such as the sewage treatment plant and a pump station provided in a trunk sewer. In order to actually measure the amounts of sewage water in many districts upon classifying sewers, many facilities and large amounts of work are required. It is therefore practically impossible to accurately determine the present flow rates and grasp the amounts of unascertained water. This leads to a problem that the occurrence of unascertained water cannot be precisely and easily grasped.

The present invention has been made to solve such a problem, and has as its object to provide a device and method for estimating the occurrence distribution of unascertained water, which can precisely and easily estimate the occurrence distribution of unascertained water, and a recording medium.

Means of Solution to the Problem

An unascertained water occurrence distribution estimating device according to the present invention comprises unascertained water occurrence distribution estimating means for outputting an unascertained water occurrence distribution in each district, in which an occurrence distribution of unascertained water flowing into a sewer is to be estimated, on the basis of a comparison result between unascertained water occurrence function information in each district and unascertained water amount function information at a base point located downstream of each district, unascertained water occurrence distribution estimating means including first processing means for performing a pattern matching analysis between unascertained water occurrence function information in each district, which is generated from unascertained water occurrence factor information in a district of interest which includes an amount of rainfall in the district of interest, and the unascertained water amount function information including an amount of unascertained water at the base point, and second processing means for outputting a pattern matching degree for each district which is obtained by the pattern matching analysis as an unascertained water occurrence distribution in each district.

An unascertained water occurrence distribution estimating method according to the present invention comprises the unascertained water occurrence distribution estimating step of outputting an unascertained water occurrence distribution in each district, in which an occurrence distribution of unascertained water flowing into a sewer is to be estimated, on the basis of a comparison result between unascertained water occurrence function information in each district and unascertained water amount function information at a base point located downstream of each district, the unascertained water occurrence distribution estimating step including the first step of performing a pattern matching analysis between unascertained water occurrence function information in each district, which is generated from unascertained water occurrence factor information in a district of interest which includes an amount of rainfall in the district of interest, and the unascertained water amount function information including an amount of unascertained water at the base point, and the second step of outputting a pattern matching degree for each district which is obtained by the pattern matching analysis as an unascertained water occurrence distribution in each district.

A recording medium according to the present invention records a program for causing a computer for an unascertained water occurrence distribution estimating device, which outputs an unascertained water occurrence distribution in each district, in which an occurrence distribution of unascertained water flowing into a sewer is to be estimated, on the basis of a comparison result between unascertained water occurrence function information in each district and unascertained water amount function information at a base point located downstream of each district, to execute the first step of performing a pattern matching analysis between unascertained water occurrence function information in each district, which is generated from unascertained water occurrence factor information in a district of interest which includes an amount of rainfall in the district of interest, and the unascertained water amount function information including an amount of unascertained water at the base point, and the second step of outputting a pattern matching degree for each district which is obtained by the pattern matching analysis as an unascertained water occurrence distribution in each district.

EFFECTS OF THE INVENTION

According to the present invention, a pattern matching analysis is performed between unascertained water occurrence function information in each district, which is generated from unascertained water occurrence factor information in a district of interest which includes the amount of rainfall in the district of interest, and unascertained water function information including the amount of unascertained water at a base point. The pattern matching degrees in the respective districts which are obtained by these pattern matching analyses are output as unascertained water occurrence distributions in the respective districts. This makes it unnecessary to actually measure the amounts of sewage water in many districts upon classifying sewers. Therefore, the occurrence distribution of unascertained water in each district can be easily and precisely grasped from, for example, unascertained water occurrence function information such as rainfall amount data in each district and unascertained water amount function information such as unascertained water amount data at a base point.

DETAILED DESCRIPTION OF THE INVENTION

An embodiment of the present invention will be described next with reference to the accompanying drawings.

[Arrangement of Unascertained Water Occurrence distribution Estimating Device]

Figure 1:
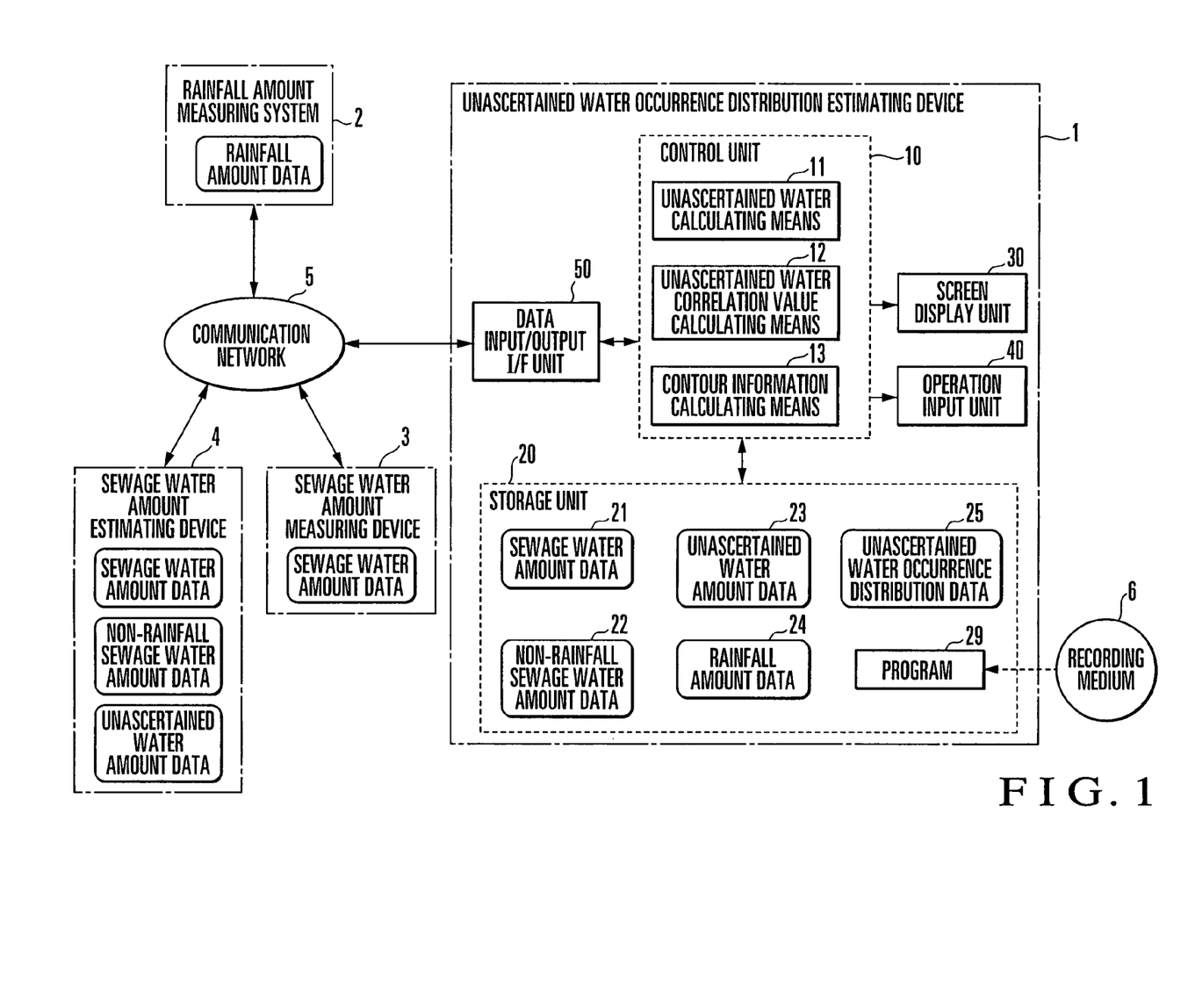
FIG. 1 is a block diagram showing the arrangement of an unascertained water occurrence distribution estimating device according to an embodiment of the present invention.

An unascertained water occurrence distribution estimating device according to an embodiment of the present invention will be described first with reference to FIG. 1. FIG. 1 is a block diagram showing the arrangement of an unascertained water occurrence distribution estimating device according to an embodiment of the present invention.

An unascertained water occurrence distribution estimating device 1 is a device which estimates the occurrence distribution of unascertained water in each district as an estimation target in accordance with unascertained water occurrence function information generated from unascertained water occurrence factor information including the amount of rainfall in each district and unascertained water amount function information including the amount of unascertained water at a base point located downstream of the respective districts.

Unascertained water occurrence function information is data calculated from a function having various kinds of parameters associated with the occurrence amount of unascertained water, i.e., unascertained water occurrence factor information, such as the amount of solar radiation in each district, the amount of percolation of rain through the soil, and the amount of evaporation of rain, as well as rainfall amount data indicating a time-series change in the amount of rainfall in each district as an estimation target.

Unascertained water amount function information is data calculated from a function having various kinds of parameters associated with the amount of unascertained water at an arbitrary base point in a target sewer, e.g., weather information such as a temperature and humidity at the base point and the flow rate at the base point as well as unascertained water amount data indicating a time-series change in unascertained water contained in the amount of sewage water at the base point.

The unascertained water occurrence distribution estimating device 1 performs a pattern matching analysis with respect to unascertained water occurrence function information and unascertained water amount function information in each district (the first processing means/first step), and outputs the pattern matching degrees obtained by the pattern matching analyses as unascertained water occurrence distributions in the respective districts (the second processing means/second step). In this case, as a pattern matching analysis, a general analysis technique such as a correlation analysis of obtaining a correlation value between two data or a DP matching (Dynamic Programming) analysis.

The unascertained water occurrence distribution estimating device 1 is connected to a rainfall amount measuring system 2, sewage water amount measuring device 3, or sewage water amount estimating device 4 through a communication network 5 to acquire various kinds of data necessary for the calculation of unascertained water and the estimation of an unascertained water occurrence distribution, as needed.

In the present invention, in consideration of the fact that in a district where unascertained water is large in amount, a change in the amount of rainfall in the district has a strong correlation with a change in the amount of unascertained water contained in sewage water at a base point located downstream of the district, an unascertained water occurrence distribution is estimated by calculating such a correlation value in each district.

The following will exemplify a case wherein the amount of rainfall in each district is obtained as unascertained water occurrence factor information in each district, rainfall amount data 24 representing a time-series change in each amount of rainfall is obtained as unascertained water occurrence function information in each district, unascertained water amount data 23 representing a time-series change in unascertained water at a base point is obtained as unascertained water amount function information at the base point, and a correlation value between the rainfall amount data 24 at each point and the unascertained water amount data at the base point is obtained as a pattern matching degree (comparison result) obtained by a pattern matching analysis between the two data, thereby estimating an unascertained water occurrence distribution at each point.

The unascertained water occurrence distribution estimating device 1 is provided with a control unit 10, storage unit 20, screen display unit 30, operation input unit 40, and data input/output interface unit (to be referred to as a data input/output I/F unit hereinafter) 50.

The control unit 10 is comprised of a microprocessor such as a CPU and its peripheral circuits. The control unit 10 reads in a program 29 stored in advance in the storage unit 20 and executes it to implement each functional means necessary for the estimation of an unascertained water occurrence distribution by making the above hardware operate in cooperation with the program.

The storage unit 20 is comprised of a storage device such as a hard disk or memory, and stores, as various kinds of data used for processing in the control unit 10, sewage water amount data 21 representing a time-series change in the amount of sewage water at an arbitrary base point in a target sewer, non-rainfall sewage water amount data 22 representing a time-series change in the amount of sewage water at the base point in a non-rainfall weather (fine weather), the unascertained water amount data 23 representing a time-series change in the amount of unascertained water at the base point, the rainfall amount data 24 representing a time-series change in the amount of rainfall in each target district, and the program 29 to be executed by the control unit 10. Note that the program 29 is read in from a recording medium 6 such as a CD-ROM in which the program 29 is stored or read in from a device which holds the program 29 through the communication network 5 and data input/output I/F unit 50, and is stored in the storage unit 20 in advance.

The screen display unit 30 is comprised of a display device such as an LCD or CRT and displays various kinds of information such as an estimation result on an unascertained water occurrence distribution on the screen.)

The operation input unit 40 is comprised of operation input devices such as a keyboard and mouse.

The operation input unit 40 detects operation by a user and outputs the corresponding information to the control unit 10.

The data input/output I/F unit 50 connects to the communication network 5 or an external device (not shown) to input/output various kinds of data necessary for processing in the control unit 10 and processing results.

As functional means of the control unit 10, an unascertained water calculating means 11, unascertained water occurrence distribution estimating means 12, and contour information calculating means 13 are provided.

The unascertained water calculating means 11 calculates the unascertained water amount data 23 at a base point from the difference between the sewage water amount data 21 in the storage unit 20 at the base point and the non-rainfall sewage water amount data 22.

The unascertained water occurrence distribution estimating means 12 estimates an unascertained water occurrence distribution by calculating a correlation value between the rainfall amount data 24 at each point as an estimation target and the unascertained water amount data 23.

The contour information calculating means 13 calculates a correlation value around each district as interpolation information by performing interpolation computation of a correlation value in each district, and generates contour information representing an unascertained water occurrence distribution by using the obtained interpolation information, thereby outputting the generated information as unascertained water occurrence distribution data 25.

[Operation of Unascertained Water Occurrence distribution Estimating Device]

Figure 2:
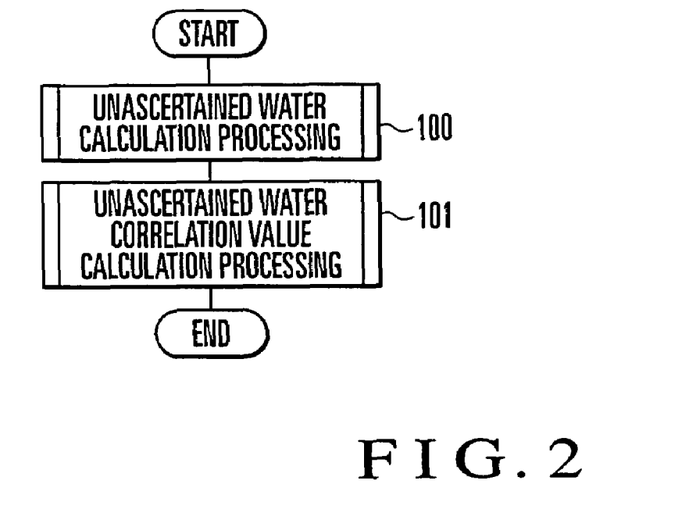
FIG. 2 is a flowchart showing the operation of the unascertained water occurrence distribution estimating device.

The operation of the unascertained water occurrence distribution estimating device according to this embodiment will be described next with reference to FIG. 2. FIG. 2 is a flowchart showing the operation of the unascertained water occurrence distribution estimating device. The control unit 10 of the unascertained water occurrence distribution estimating device 1 starts the operation in FIG. 2 in accordance with processing start operation through the operation input unit 40.

First of all, the control unit 10 calculates the unascertained water amount data 23 representing a time-series change in unascertained water at a base point by executing unascertained water calculation processing using the unascertained water calculating means 11 (step 100). As this base point, an arbitrary point may be selected from points at which the amounts of sewage water can be actually measured downstream of each district as an estimation target in a sewer, such as a sewage treatment plant or a pump station on a trunk sewer.

The control unit 10 then estimates an unascertained water occurrence distribution by calculating a correlation value (comparison result) between the unascertained water amount data 23 (unascertained water amount function information) and the rainfall amount data 24 (unascertained water occurrence function information) in each district using the unascertained water occurrence distribution estimating means 12, and outputs each correlation value as the unascertained water occurrence distribution data 25 (step 101), thus terminating the series of unascertained water occurrence distribution estimation processing.

Note that as the unascertained water amount data 23, data acquired from the sewage water amount estimating device 4 through the communication network 5 may be used as long as it can be calculated outside the device, for example, by the sewage water amount estimating device 4.

[Unascertained Water Calculation Processing]

Figure 3:
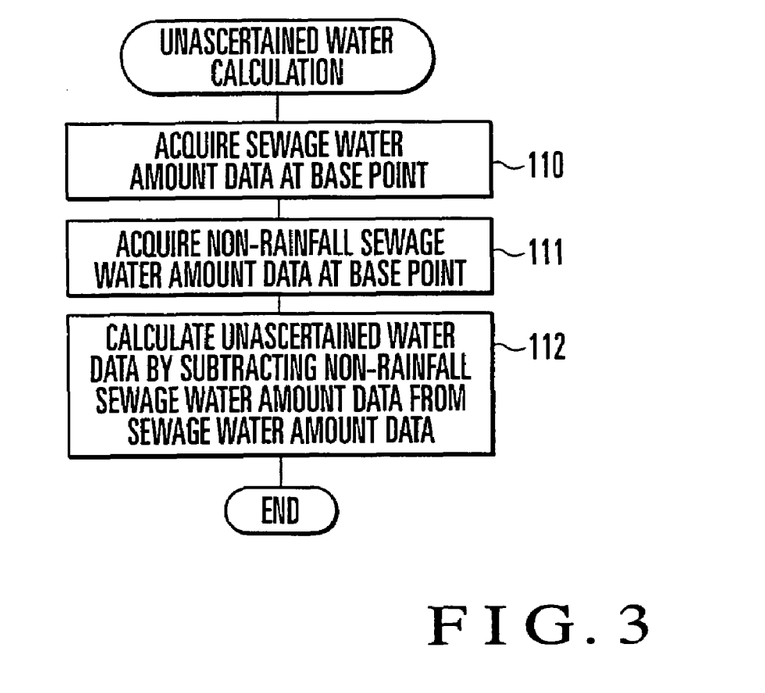
FIG. 3 is a flowchart showing unascertained water calculation processing.

Unascertained water calculation processing will be described next with reference to FIG. 3. FIG. 3 is a flowchart showing unascertained water calculation processing.

When calculating unascertained water, first of all, the unascertained water calculating means 11 acquires the sewage water amount data 21 representing a time-series change in the amount of sewage water at a base point from the storage unit 20 (step 110), and acquires the non-rainfall sewage water amount data 22 representing a time-series change in the amount of sewage water at the base point in a non-rainfall weather from the storage unit 20 (step 111). The sewage water amount data 21 may be acquired from the sewage water amount measuring device 3 or sewage water amount estimating device 4 through the communication network 5.

The non-rainfall sewage water amount data is then subtracted from the sewage water amount data to calculate unascertained water amount data (step 112), and the series of unascertained water calculation processing is terminated.

Figure 4A:
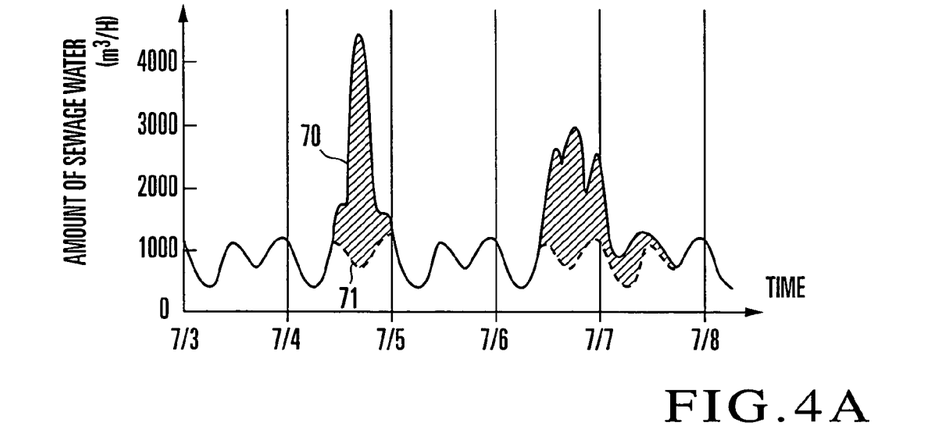
FIG. 4A is a graph showing a time-series change in the amount of sewage water at a base point.
Figure 4B:
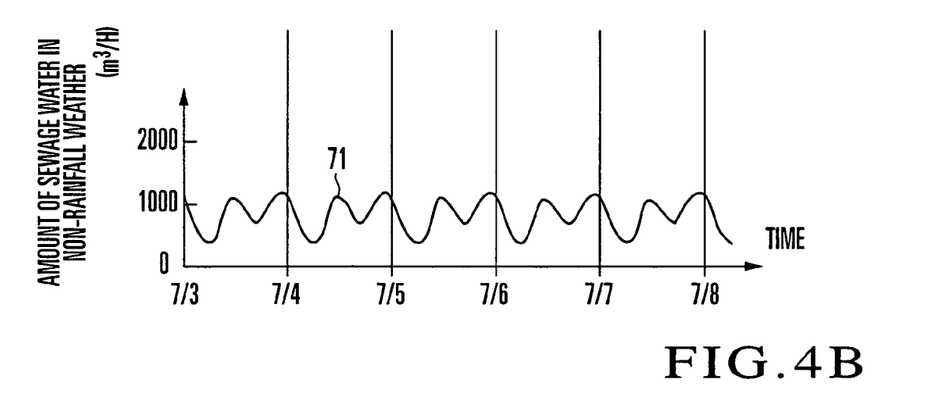
FIG. 4B is a graph showing a time-series change in the amount of sewage water at the base point in a non-rainfall weather.
Figure 4C:
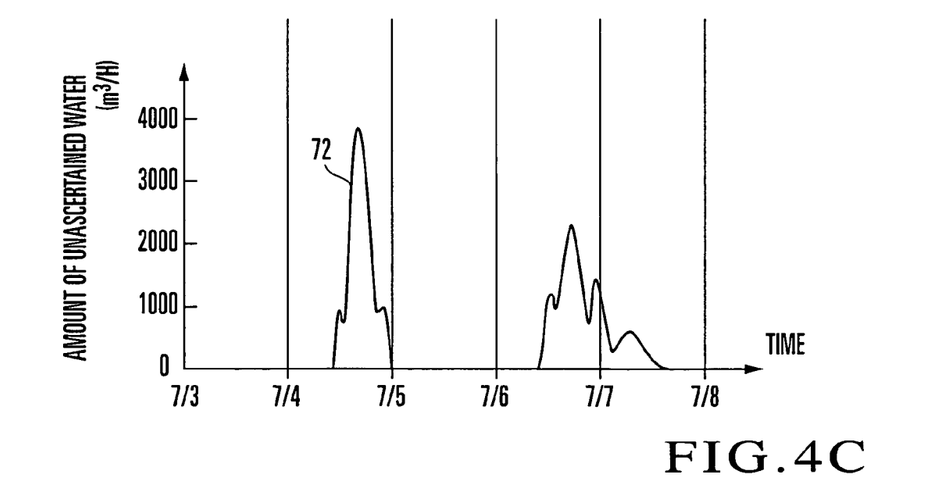
FIG. 4C is a graph showing a time-series change in the amount of unascertained water at the base point.

A method of calculating unascertained water will be described with reference to FIGS. 4A to 4C. FIGS. 4A, 4B, and 4C are graphs respectively showing time-series changes in the amount of sewage water, the amount of sewage water in a non-rainfall weather, and the amount of unascertained water at a base point.

Unascertained water is mainly caused by rainwater which should not flow into a separate system sewer. As shown in FIG. 4A, an actually measured sewage water amount 70 greatly increases according to rainfall.

Although the consumption of clean water changes according to season, temperature, day of the week, and holiday, the consumption of clean water in a non-rainfall weather, i.e., a non-rainfall sewage amount 71, changes in almost the same pattern every 24 hr, as shown in FIG. 4B. This amount of sewage water can therefore be estimated with high accuracy (see, for example, Japanese Patent Laid-Open No. 2003-027567).

As described above, the sewage water amount 70 includes domestic wastewater and rainwater. An unascertained water amount 72 can therefore be calculated-by subtracting the domestic wastewater, i.e., the non-rainfall sewage amount 71, from the actually measured sewage water amount 70.

FIG. 4C shows a time-series change in the calculated unascertained water amount 72. When the sewage water amount 70 increases due to rainfall, the unascertained water amount 72 also increases accordingly.

Since the unascertained water amount 72 is calculated by subtracting the non-rainfall sewage amount 71 from the sewage water amount 70 at the base point, unascertained water can be calculated easily and accurately.

Although as the sewage water amount 70, data actually measured at the base point by the sewage water amount measuring device 3 may be used, sewage water amount data estimated by the sewage water amount estimating device 4 in accordance with season, temperature, day of the week, and holiday may be used.

In addition, although as the non-rainfall sewage amount 71, data actually measured at the base point in a non-rainfall weather by the sewage water amount measuring device 3 may be used, non-rainfall sewage amount data estimated by the sewage water amount estimating device 4 in accordance with season, temperature, day of the week, and holiday may be used.

[Unascertained Water Occurrence Distribution Estimation Processing]

Figure 5:
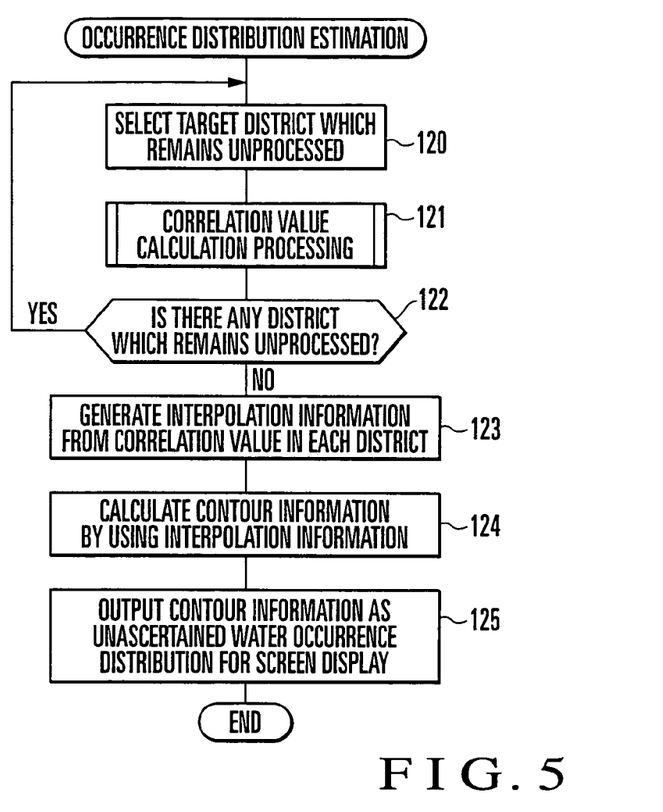
FIG. 5 is a flowchart showing unascertained water occurrence distribution estimation processing.

Unascertained water occurrence distribution estimation processing will be described next with reference to FIG. 5. FIG. 5 is a flowchart showing unascertained water estimation processing.

When estimating an unascertained water occurrence distribution, first of all, the unascertained water occurrence distribution estimating means 12 selects one of districts provided in an estimation target area which remains unprocessed and in which no correlation value has been calculated (step 120), and executes unascertained water correlation value calculation processing of calculating a correlation value (pattern matching degree/comparison result) between the rainfall amount data 24 (unascertained water occurrence function information) and the unascertained water amount data 23 (unascertained water amount function information) in the district of interest (step 121).

With this operation, the unascertained water occurrence distribution estimating means 12 performs a pattern matching analysis between the rainfall amount data 24 (unascertained water occurrence function information) in the area and the unascertained water amount data 23 (unascertained water amount function information) at the base point (the first processing means/first step), and outputs the correlation value (pattern matching degree/comparison result) obtained by the pattern matching analysis as an unascertained water occurrence distribution (the second processing means/second step) in the district of interest.

If there is still a district, in the target area, which remains unprocessed and in which no correlation value has been calculated (step 122: YES), the flow returns to step 120 to execute correlation value calculation for the new district.

If correlation values are calculated for all the districts (step 122: NO), a correlation value at a point around each district is generated as interpolation information by performing interpolation computation of the correlation value in each district (step 123), and the unascertained water occurrence distribution data 25 is generated by calculating contour information representing an unascertained water occurrence distribution using these pieces of interpolation information (step 124). The unascertained water occurrence distribution data 25 is graphically displayed on the screen display unit 30 (step 125), and the series of unascertained water occurrence distribution estimation processing is terminated.

Figure 6:
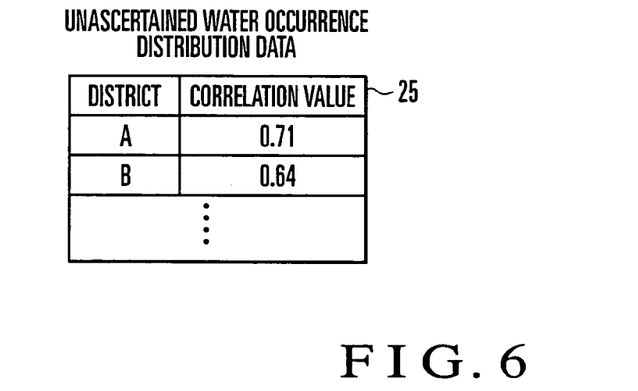
FIG. 6 is a view showing an example of unascertained water occurrence distribution data.

FIG. 6 shows an example of the arrangement of unascertained water occurrence distribution data, in which the correlation values calculated for the respective districts are made to correspond to the respective districts. This correlation value indicates the similarity between the district of interest and a time-series change in unascertained water. As a correlation value approaches 0, the relevance (similarity) between the amount of rainfall in the district of interest and unascertained water decreases, thus indicating that the occurrence of unascertained water in the district of interest is relatively low. As a correlation value approaches 1, the relevance (similarity) between the amount of rainfall in the district of interest and unascertained water increases, thus indicating that the occurrence of unascertained water in the district of interest is relatively high.

FIGS. 7A to 7F show graphic display examples of unascertained water occurrence distribution data.

Figure 7A:
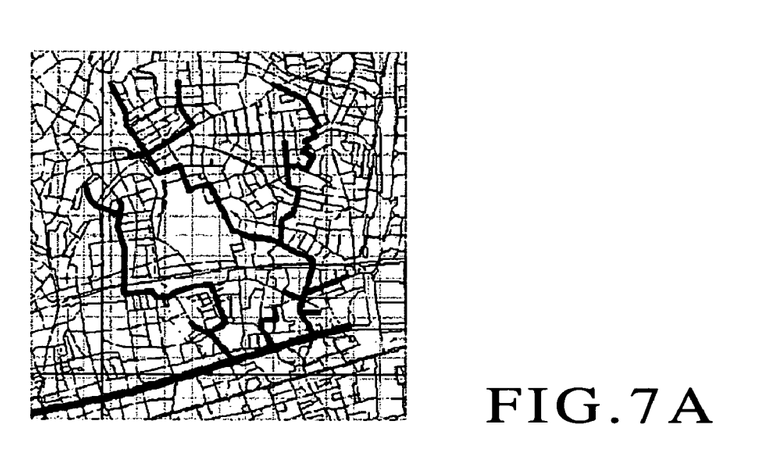
FIG. 7A is a view showing an output example (trunk sewer laying view) of unascertained water occurrence distribution data.
Figure 7B:
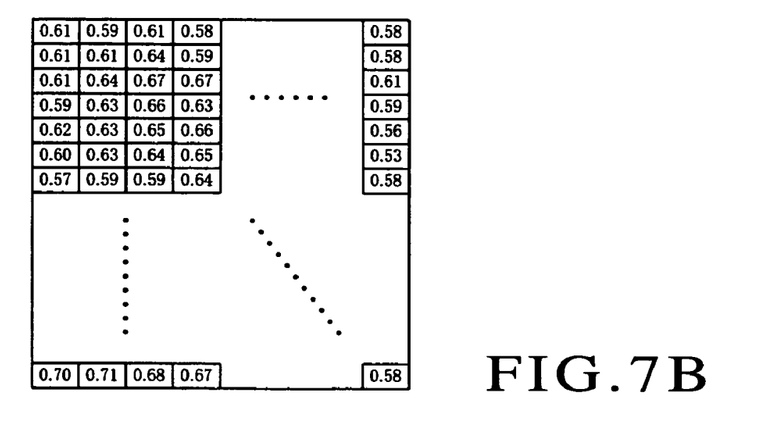
FIG. 7B is a view showing an output example (unascertained water occurrence distribution data estimation values) of unascertained water occurrence distribution data.
Figure 7C:
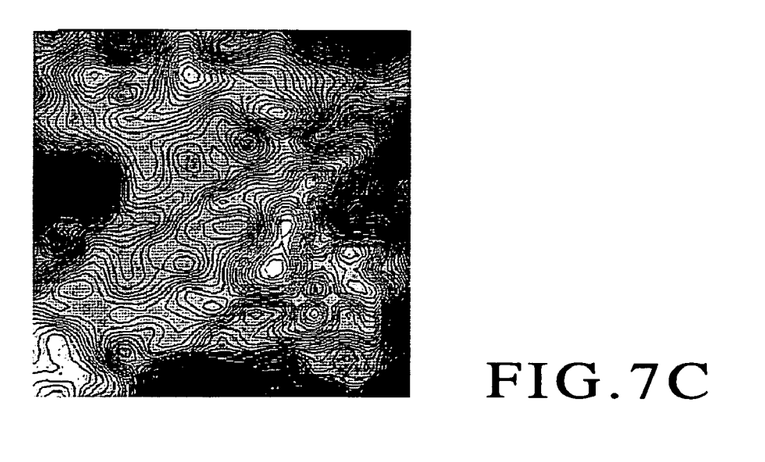
FIG. 7C is a view showing an output example (contour graph) of unascertained water occurrence distribution data.

FIG. 7A is a view showing how trunk sewers are laid in an estimation target area and shows a display example of a superimposition of an urban area map on the view. FIG. 7B shows unascertained water occurrence distribution data (see FIG. 6) estimated by the unascertained water occurrence distribution estimating device according to this embodiment, in which correlation values associated with the respective districts (meshes) are arranged at the positions of the districts. FIG. 7C is an unascertained water occurrence distribution graph (contour graph) obtained by performing interpolation processing of the unascertained water occurrence distribution data in FIG. 7B. In this graph, the correlation values in the respective districts are displayed in the form of contours, which are displayed with different colors in accordance with the magnitudes of unascertained water occurrence correlations. This example shows that whiter regions correspond to higher correlation values and indicate higher occurrence of unascertained water.

Figure 7D:
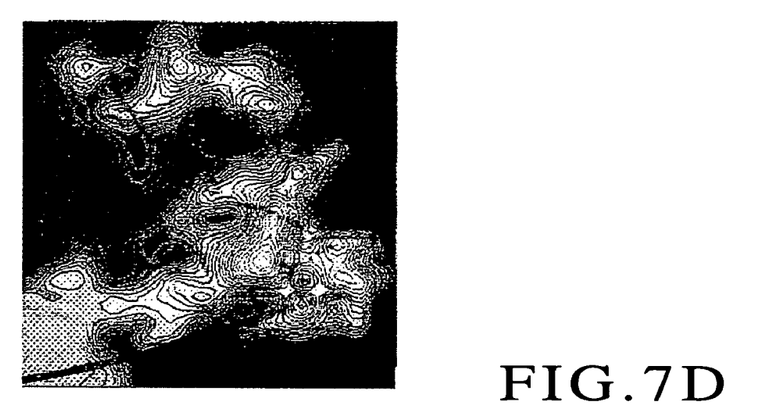
FIG. 7D is a view showing an output example (unascertained water occurrence distribution data estimation values/trunk sewer laying view) of unascertained water occurrence distribution data.

FIG. 7D is a view obtained by superimposing the unascertained water occurrence distribution graph in FIG. 7B on the trunk sewer laying view in FIG. 7A, and shows the existence of white districts around trunk sewers. This view allows easy visual recognition of portions where unascertained water has occurred.

Figure 7E:
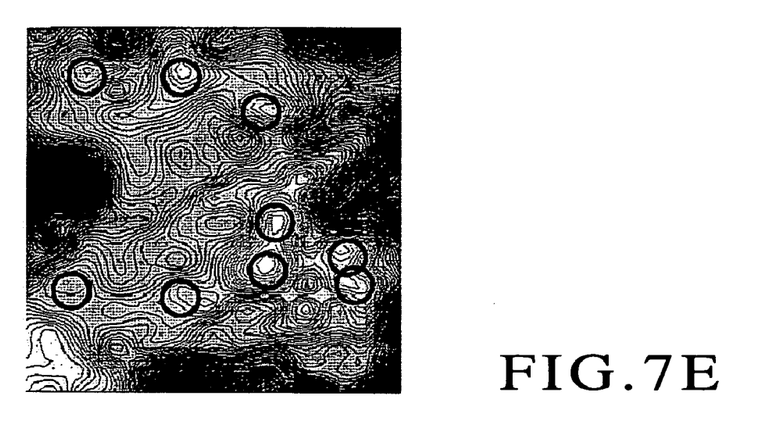
FIG. 7E is a view showing an output example (unascertained water occurrence portions) of unascertained water occurrence distribution data.
Figure 7F:
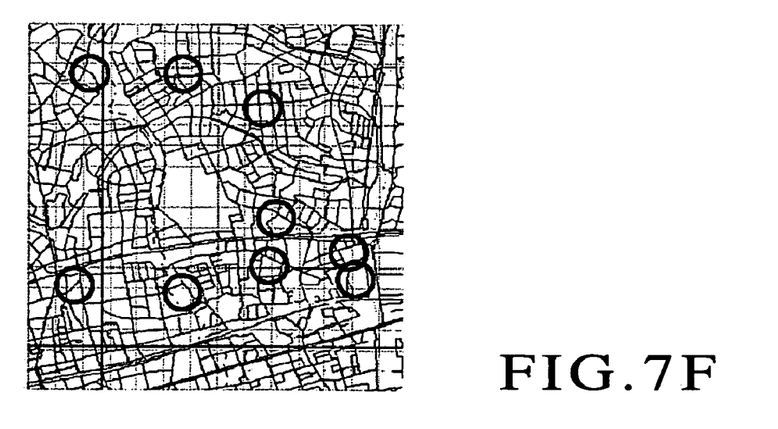
FIG. 7F is a view showing an output example (unascertained water occurrence portions/urban area map) of unascertained water occurrence distribution data.

FIG. 7E shows how the unascertained water occurrence portions in FIG. 7C are specified by circles. Superimposing these circles on the urban area map in FIG. 7F makes it possible to easily check, on the urban area map, in which districts unascertained water has actually frequently occurred.

Not that graphic display examples on the screen display unit are not limited to those shown in FIGS. 7A to 7F. A combination of these display examples or another display method may be used.

In this manner, the unascertained water occurrence distribution estimating means 12 of the control unit 10 calculates a correlation value (comparison result/pattern matching degree) between the rainfall amount data 24 in each district and the unascertained water amount data 23 from the rainfall amount data 24 (unascertained water occurrence function information) representing a time-series change in the amount of rainfall (unascertained water occurrence factor information) in each district as an estimation target and the unascertained water amount data 23 (unascertained water amount function information) representing a time-series change in the amount of unascertained-water at a base point located downstream of each of the districts, and outputs the calculated correlation values as unascertained water occurrence distributions in the respective districts. This makes it unnecessary to actually measure the amounts of sewage water in many districts upon classifying sewers, and makes it possible to precisely and easily grasp the occurrence of unascertained water from the rainfall amount data 24 and the unascertained water amount data 23 at the base point.

[Correlation Value Calculation Processing]

Figure 8:
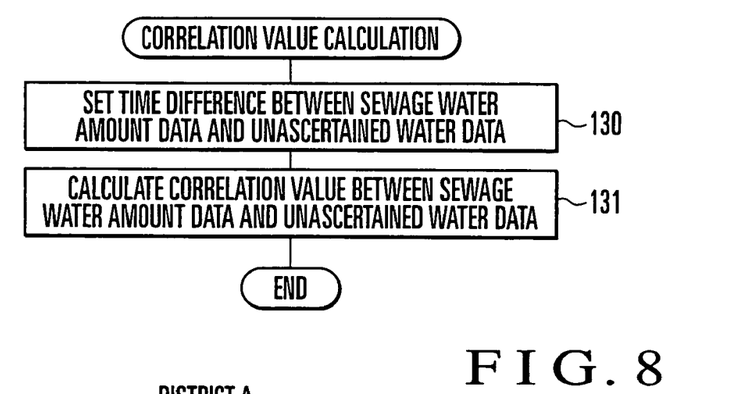
FIG. 8 is a flowchart showing correlation value calculation processing.

Correlation value calculation processing will be described next with reference to FIG. 8. FIG. 8 is a flowchart showing correlation value calculation processing.

When calculating a correlation value between the rainfall amount data 24 in an arbitrary district and the unascertained water amount data 23, first of all, the unascertained water occurrence distribution estimating means 12 corrects the time difference between the rainfall amount data 24 and the unascertained water amount data 23 (step 130). It takes a certain period of time for rain that has fallen in a given district to reach a base point located downstream through a sewer. When, therefore, a correlation between the rainfall amount data 24 and the unascertained water amount data 23 is to be calculated, their time difference must be corrected.

As this time difference, the reaching time from the district of interest to the base point which is obtained in advance may be used. Assume that the corresponding sewer has the arrangement shown in FIG. 9. In this case, rainwater in a district A partly enters a trunk sewer 61 and reaches a sewage treatment plant 63 through a trunk sewer 60. Rainwater in a district B also partly enters a trunk sewer 62, merges with sewage water from the trunk sewer 61 at the trunk sewer 60, and reaches the sewage treatment plant 63.

Figure 9:
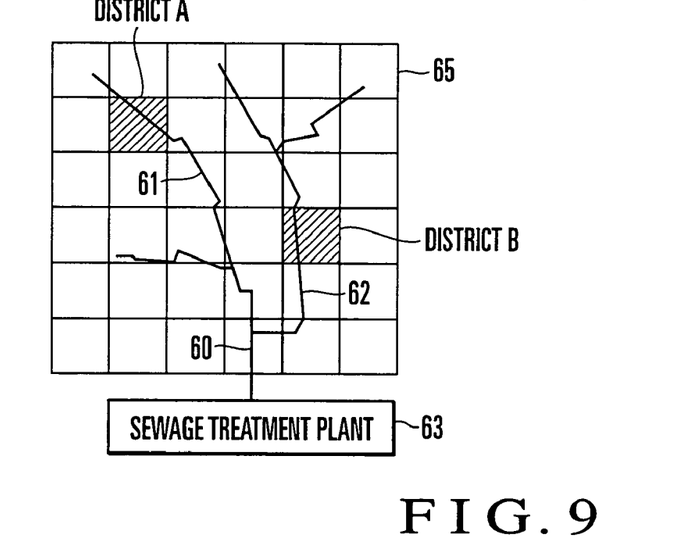
FIG. 9 is a view showing an example of the arrangement of a sewer.
Figure 10:
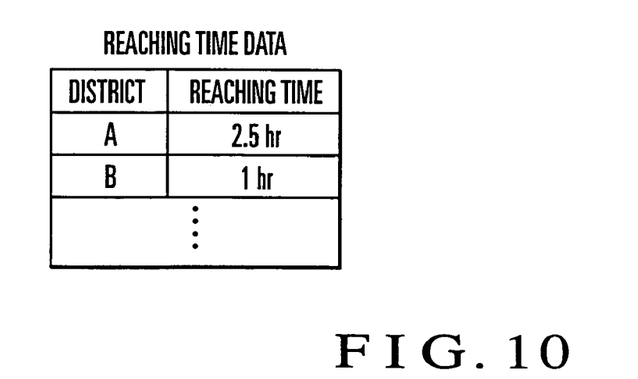
FIG. 10 is a view showing an example of the arrangement of reaching time data.

In this case, the length of the reaching path from the district A to the sewage treatment plant 63 differs from that from the district B, and hence the time required to reach the plant through one path differs from that through the other path. Therefore, reaching time data like those shown in FIG. 10 are stored in the storage unit 20 in advance. When a correlation value in an arbitrary district is to be obtained, it suffices to correct the time difference between the rainfall amount data 24 and the unascertained water amount data 23 by using the reaching time corresponding to the district of interest.

Figure 11A:
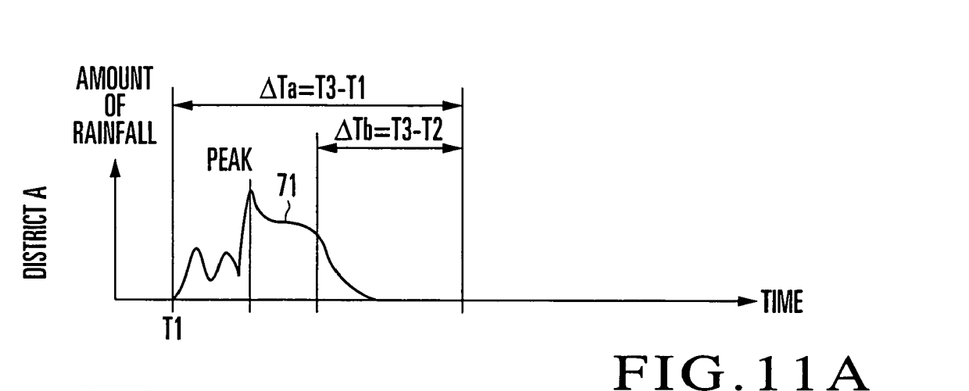
FIG. 11A is a graph for explaining rainfall amount data in a district A.
Figure 11B:
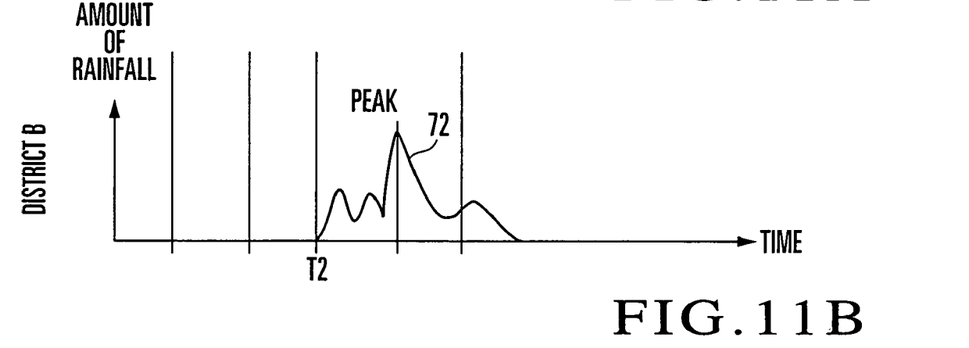
FIG. 11B is a graph for explaining rainfall amount data in a district B.
Figure 11C:
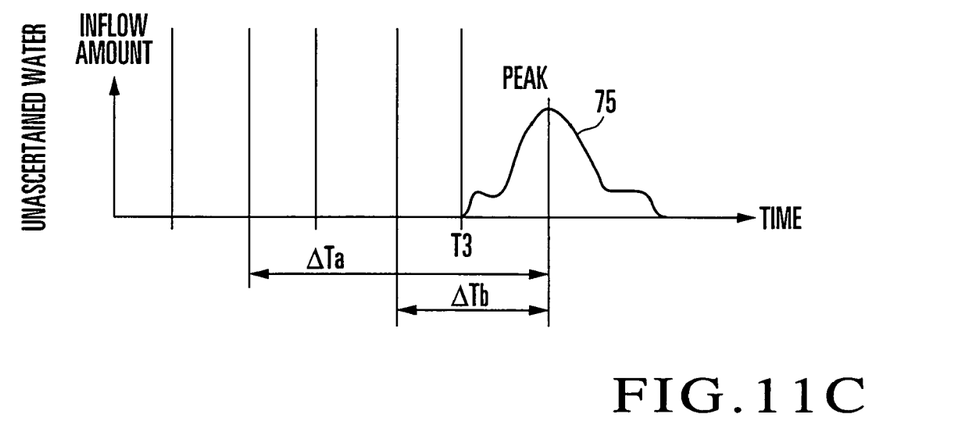
FIG. 11C is a graph for explaining time difference correction between the rainfall amount data and unascertained water data in the districts A and B.

FIGS. 11A to 11C are graphs for explaining time difference correction between rainfall amount data in the districts A and B and unascertained water amount data. Assume that rainfall amount data 71 in the district A begins to increase at time T1 as shown in FIG. 11A, and rainfall amount data 72 in the district B begins to increase at time T2 as shown in FIG. 11B. Assume also that at the base point, as shown in FIG. 11C, unascertained water begins to increase at time T3.

This therefore indicates that it has taken $\Delta Ta = T3 - T1$ for rainwater to reach the base point from the district A, and that it has taken $\Delta Tb = T3 - T2$ for rainwater to reach the base point from the district B.

That is, $\Delta Ta$ and $\Delta Tb$ respectively represent the reaching times corresponding to the districts A and B. When the time differences between rainfall amount data 71 and 72 and unascertained water amount data 75 are corrected in accordance with these reaching times, the two data are synchronized with each other on the time axis. This makes it possible to accurately calculate a correlation value.

Note that it suffices to calculate a time difference $\Delta T$ from the rainfall amount data 24 and unascertained water amount data 23, which are used for the calculation of a correlation value, instead of by measuring a reaching time corresponding to each district in advance. For example, the peaks (maximum values) of the rainfall amount data 24 and unascertained water amount data 23 may be found, and the time difference between the peaks may be set as the time difference $\Delta T$. Alternatively, the start and end points of rainfall amount data and unascertained water amount data may be used instead of peaks.

After the time difference between the rainfall amount data 24 and the unascertained water amount data 23 is corrected to correct the time difference between the two data in this manner, a correlation value between the two data is calculated (step 131). The series of correlation value calculation processing is then terminated.

The correlation value between the rainfall amount data 24 and the unascertained water amount data 23 whose time difference is corrected is obtained by using time-series data contained in these data within predetermined period of times.

Since the time difference between the rainfall amount data 24 and the unascertained water amount data 23 is corrected to obtain a correlation value between the two data in this manner, an appropriate correlation value can be obtained for each district.

In addition, since the reaching time of rainwater in each district is prepared in advance to correct the time difference between two data by using the reaching time in a corresponding district, the time difference between the two data can be corrected with relatively simple processing.

Furthermore, the time difference between two data may be corrected on the basis of the time difference obtained from the time difference between the peaks of the two data, and the time difference between the two data can be corrected without preparing time difference for each district.

[Another Correlation Value Calculation Processing]

Figure 12:
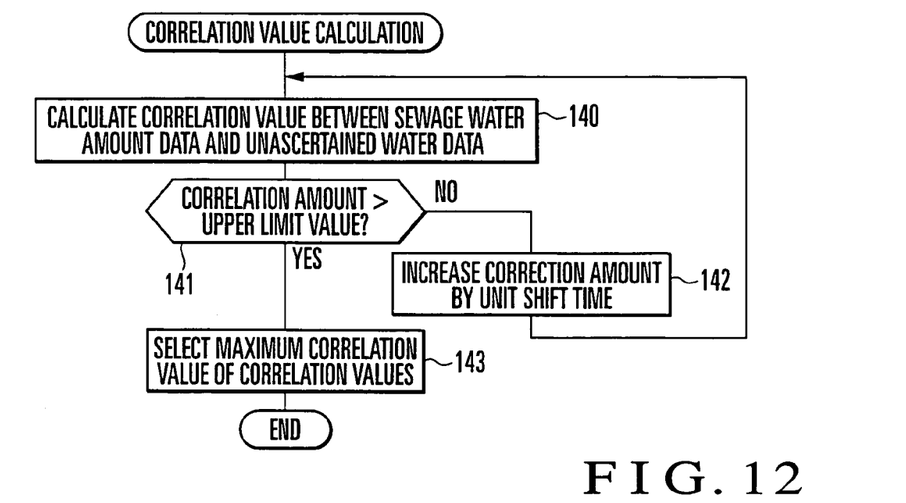
FIG. 12 is a flowchart showing another correlation value calculation processing.

Another correlation value calculation processing will be described next with reference to FIG. 12. FIG. 12 is a flowchart showing another correlation value calculation processing.

In the above correlation value calculation processing (see FIG. 8), the time difference between the rainfall amount data 24 and the unascertained water amount data 23 is corrected altogether by using the time difference corresponding to each district or the time difference between the peaks of the two data.

In this case, an optimal correlation value is obtained by shifting the time difference between the rainfall amount data 24 and the unascertained water amount data 23 little by little.

Figure 13A:
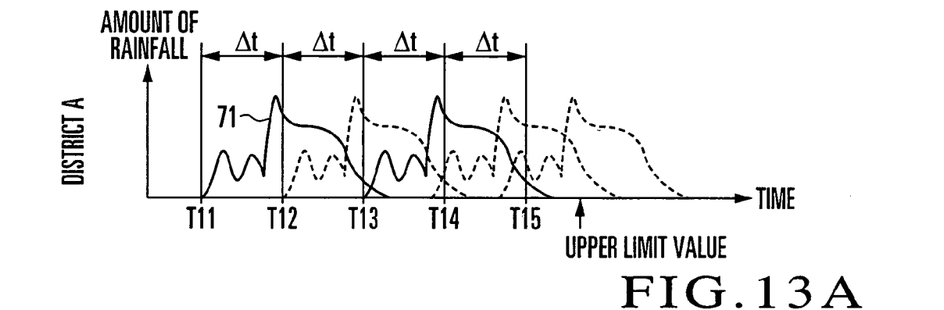
FIG. 13A is a graph for explaining rainfall amount data in the district A.
Figure 13B:
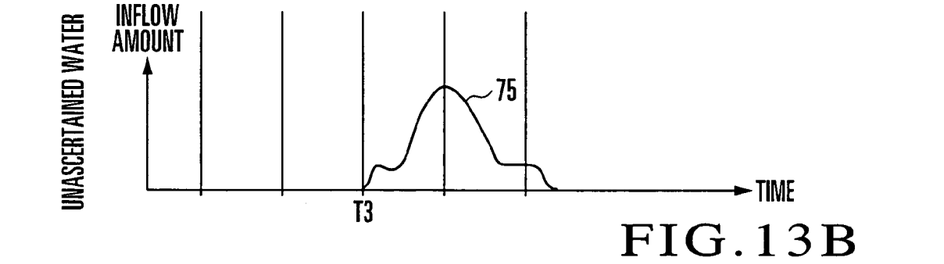
FIG. 13B is a graph for explaining the inflow amount of unascertained water.
Figure 13C:
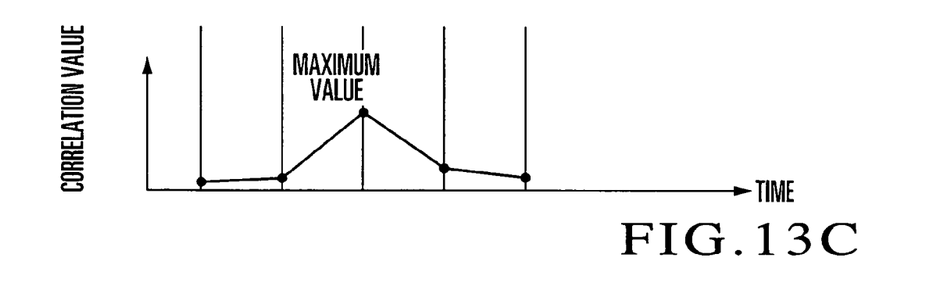
FIG. 13C is a graph for explaining a correlation value between the rainfall amount data and the inflow amount of unascertained water in the district A.

FIGS. 13A to 13C are graphs for explaining a specific example of the correlation value calculation processing in FIG. 12, showing rainfall amount data in the district A, the inflow amount of unascertained water, and the correlation value between these data. First of all, the unascertained water occurrence distribution estimating means 12 calculates a correlation value by using time-series data contained in predetermined periods of the rainfall amount data 24 and unascertained water amount data 23 (step 140). First of all, a correlation value between the rainfall amount data 71 and the unascertained water amount data 75 obtained from time T11 is obtained. In this case, the time difference between the two data is not corrected, and hence the correction amount is 0.

It is then determined whether the correction amount for the two data on the time axis has reached a predetermined upper limit value (step 141).

If the correction amount has not reached the upper limit value (step 141: NO), the time difference between the two data is corrected by a unit shift time $\Delta t$ (step 142), and the flow returns to step 140 to obtain a new correlation value. With this operation, a correlation value between the rainfall amount data 71 shifted to time T12 and the unascertained water amount data 75 is obtained. A correlation value is obtained for each correction amount until the correction amount reaches the upper limit value.

If it is determined in step 141 that the correction amount has reached the upper limit value at Tmax (step 141:YES), the maximum correlation value is selected from the respective correlation values that have been obtained, and is output as a correlation value between the rainfall amount data 24 and the unascertained water amount data 23 in the district of interest (step 143). The series of correlation value calculation processing is then terminated.

Since a correlation value is calculated while the time difference between the rainfall amount data 24 and the unascertained water amount data 23 is shifted little by little, and the maximum correlation value of the calculated correlation values is calculated as a correlation value in the district of interest in this manner, a correlation value between the two data can be calculated with high accuracy.

Note that in these correlation value calculation processing operations, as the rainfall amount data 24 and unascertained water amount data 23 from which a correlation value is actually obtained, data corresponding to several hours, several days, several weeks, or several months may be used.

The above description has exemplified the case wherein the unascertained water amount data 23 used for the estimation of an unascertained water occurrence distribution is calculated by using the unascertained water calculating means 11 of the control unit 10. However, the present invention is not limited to this, and unascertained water amount data calculated by another device, e.g., the sewage water amount estimating device 4, may be acquired and used.

In addition, the unascertained water occurrence distribution estimating means 12 of the control unit 10 may be provided for the sewage water amount estimating device 4, and estimation of the amount of sewage water flowing into the sewage treatment plant and estimation associated with unascertained water can be processed altogether.

Note that as rainfall amount data, rainfall amount data provided every 17 km from AMEDAS in the Meteorological Agency serving as the rainfall amount measuring system 2 or rainfall amount data provided every 2.5 km from radar AMEDAS may be used. Alternatively, rainfall amount data provided every 250 m from radar AMEDAS in a municipality may be used.

The above embodiment has exemplified the case wherein the amount of rainfall at each point is used as unascertained water occurrence factor information at each point, the rainfall amount data 24 representing a time-series change in the amount of rainfall at each point is used as unascertained water occurrence function information at each point, and the unascertained water amount data 23 representing a time-series change in unascertained water at a base point is used as unascertained water amount function information at the base point. However, the present invention is not limited to this.

As unascertained water occurrence factor information, various kinds of parameters associated with the occurrence amount of unascertained water, e.g., the amount of solar radiation in each district, the amount of percolation of rain through the soil, and the amount of evaporation of rain, as well as the above amount of rainfall, may be used, and time-series data calculated from the function having these parameters may be used as unascertained water occurrence function information in place of the rainfall amount data 24. In addition, as unascertained water amount function information, i.e., the unascertained water amount data 23, time-series data calculated from various kinds of parameters associated with the amount of unascertained water at a base point, such as weather information, e.g., a temperature and humidity at the base point and the flow rate of sewage water at the base point may be used.

The above embodiment has exemplified the case wherein a correlation analysis is used as a pattern matching analysis for unascertained water occurrence function information and unascertained water amount function information, and a correlation value is used as a pattern matching degree (comparison result) obtained by a pattern matching analysis. However, the present invention is not limited to this. As a processing method for a pattern matching analysis or a pattern matching degree calculation method, other known techniques may be used, and the same functions and effects as those described above can be obtained.

INDUSTRIAL APPLICABILITY

The device and method for estimating the occurrence distribution of unascertained water and recording medium according to the present invention are suitable for estimating the occurrence distribution of unascertained water flowing into a sewer, and, in particularly, suitable for estimating the occurrence distribution of unascertained water in a sewage treatment plant of a separate system designed to separately treat domestic wastewater and rainwater or an inflow piping.

The invention claimed is:

1. A device for the estimation of distribution and severity of rainfall-derived infiltration and inflow comprising:
    means for estimating the distribution and severity of rainfall-derived infiltration and inflow into a sewer system for outputting the distribution and severity of rainfall-derived infiltration and inflow in each of a plurality of districts,
    said means for estimating the distribution and severity of rainfall-derived infiltration and inflow including:
    processing means for
       i) performing a pattern matching analysis between rainfall-derived infiltration and inflow factor information for each of said districts and the amount of rainfall-derived infiltration and inflow at a corresponding base point located downstream of each of said districts, and;
    outputting the results of said pattern matching analysis.

* * * * *